United States Patent
Downing et al.

(10) Patent No.: US 10,073,460 B2
(45) Date of Patent: Sep. 11, 2018

(54) PROVIDING AUTO-GUIDANCE OF A MOBILE MACHINE WITHOUT REQUIRING A GRAPHICAL INTERFACE DISPLAY

(71) Applicant: Trimble Inc., Sunnyvale, CA (US)

(72) Inventors: Michael Downing, Sunnyvale, CA (US); John William Peake, Sunnyvale, CA (US)

(73) Assignee: Trimble Inc., Sunnyvale, CA (US)

( * ) Notice: Subject to any disclaimer, the term of this patent is extended or adjusted under 35 U.S.C. 154(b) by 0 days.

(21) Appl. No.: 15/179,074

(22) Filed: Jun. 10, 2016

(65) Prior Publication Data

US 2017/0357269 A1   Dec. 14, 2017

(51) Int. Cl.
*G01C 22/00* (2006.01)
*G05D 1/00* (2006.01)
*G05D 1/02* (2006.01)

(52) U.S. Cl.
CPC ......... *G05D 1/0219* (2013.01); *G05D 1/0088* (2013.01); *G05D 1/0221* (2013.01); *G05D 1/0278* (2013.01); *G05D 2201/0201* (2013.01)

(58) Field of Classification Search
USPC .......................................................... 701/25
See application file for complete search history.

(56) References Cited

U.S. PATENT DOCUMENTS 5,469,356 A * 11/1995 Hawkins ................ G01C 21/26
                                                      318/591

6,205,122 B1 * 3/2001 Sharon .................... H04L 41/12
                                                      370/254

(Continued)

FOREIGN PATENT DOCUMENTS

WO    2017/214430 A1    12/2017

OTHER PUBLICATIONS

Anonymous: "Installation Instructions Autopilot(TM) Automated Steering System," Jan. 31, 2013, downloaded from http://www.newhollandplm.com/upload/2831d0cb-aaa0-4179-9033-ddeded2381c7AutopilotInstallationInstructionsT6020-T6090, T6.120-T6.175, T7.170-T7.270, T7030-T7070.pdf , pp. 107-112.

(Continued)

*Primary Examiner* — Jean Paul Cass
(74) *Attorney, Agent, or Firm* — Kilpatrick Townsend & Stockton LLP

(57) ABSTRACT

Auto-guidance of a mobile machine is provided that does not require a graphical user interface display. Human interactions with the auto-guidance system of a mobile machine are performed solely with one or more electromechanical switches of the auto-guidance system while the mobile machine is operating. A first point for auto-guidance of a mobile machine is set by an auto-guidance system in response to a first electromechanical switch input. A second point for auto-guidance of the mobile machine is set by the auto-guidance system in response to a second electromechanical switch input after movement of the mobile machine from the first point. The auto-guidance system activates auto-guidance of the mobile machine along a path defined by the first point and the second point. The setting of the first point, the setting of the second point, and the activating are performed by one or more hardware processors.

20 Claims, 9 Drawing Sheets

(56) References Cited

U.S. PATENT DOCUMENTS

| | | | | |
|---|---|---|---|---|
| 6,336,051 B1* | 1/2002 | Pangels | A01B 79/005 | 700/207 |
| 6,804,597 B1* | 10/2004 | Posselius | A01B 79/005 | 701/468 |
| 6,907,326 B1* | 6/2005 | Kucik | B63G 7/02 | 114/1 |
| 8,359,141 B1* | 1/2013 | Lange | A01B 69/008 | 172/2 |
| 8,694,382 B2* | 4/2014 | Aznavorian | G05D 1/021 | 250/307 |
| 8,770,612 B2* | 7/2014 | Wendte | B60D 1/363 | 280/420 |
| 9,114,832 B2* | 8/2015 | Wang | A01B 69/006 | |
| 9,201,421 B1* | 12/2015 | Fairfield | B60W 40/04 | |
| 9,465,388 B1* | 10/2016 | Fairfield | G05D 1/0044 | |
| 9,763,037 B2* | 9/2017 | Manges | H04W 4/02 | |
| 9,952,596 B2* | 4/2018 | Foster | G05D 1/021 | |
| 2002/0089142 A1* | 7/2002 | Lukac | A01B 51/026 | 280/93.512 |
| 2002/0156556 A1* | 10/2002 | Ruffner | A01B 69/008 | 701/23 |
| 2005/0015189 A1* | 1/2005 | Posselius | A01B 79/005 | 701/50 |
| 2005/0075784 A1* | 4/2005 | Gray | A01B 69/008 | 701/25 |
| 2006/0178823 A1 | 8/2006 | Eglington et al. | | |
| 2007/0198145 A1* | 8/2007 | Norris | B60T 7/22 | 701/23 |
| 2008/0066790 A1* | 3/2008 | Rems | B08B 3/024 | 134/123 |
| 2008/0144944 A1* | 6/2008 | Breed | G06K 9/00369 | 382/224 |
| 2008/0268927 A1* | 10/2008 | Farley | A01D 41/1243 | 460/111 |
| 2009/0262760 A1* | 10/2009 | Krupkin | G01S 7/414 | 372/6 |
| 2013/0082874 A1* | 4/2013 | Zhang | G01S 5/0072 | 342/357.31 |
| 2013/0184984 A1* | 7/2013 | Armitage | G01C 21/20 | 701/409 |
| 2013/0231823 A1* | 9/2013 | Wang | A01B 69/008 | 701/24 |
| 2014/0257661 A1* | 9/2014 | Schulman | B60R 22/48 | 701/70 |
| 2014/0297067 A1* | 10/2014 | Malay | G01C 9/005 | 701/4 |
| 2015/0134178 A1* | 5/2015 | Minoiu-Enache | B60W 50/035 | 701/23 |
| 2015/0149035 A1* | 5/2015 | Enthaler | B60K 37/06 | 701/36 |
| 2015/0210317 A1* | 7/2015 | Hafner | B62D 13/06 | 701/41 |
| 2016/0012465 A1* | 1/2016 | Sharp | G06Q 20/18 | 705/14.17 |
| 2016/0035223 A1* | 2/2016 | Gutmann | B60W 30/09 | 340/907 |
| 2016/0103449 A1* | 4/2016 | Desnoyer | B60W 30/12 | 701/23 |
| 2016/0238403 A1* | 8/2016 | Brown | G01C 21/3629 | |
| 2017/0123492 A1* | 5/2017 | Marggraff | G06F 3/0236 | |
| 2017/0282362 A1* | 10/2017 | Erhart | B25J 9/163 | |
| 2017/0282365 A1* | 10/2017 | Erhart | B25J 9/1656 | |
| 2017/0282371 A1* | 10/2017 | Erhart | B25J 9/1679 | |
| 2017/0282374 A1* | 10/2017 | Matula | B25J 11/008 | |
| 2017/0282375 A1* | 10/2017 | Erhart | B25J 11/0015 | |
| 2017/0285628 A1* | 10/2017 | Erhart | G05D 1/0016 | |
| 2017/0286651 A1* | 10/2017 | Erhart | B25J 9/0003 | |
| 2017/0286708 A1* | 10/2017 | Erhart | G06F 21/56 | |
| 2017/0286916 A1* | 10/2017 | Skiba | B25J 9/1689 | |
| 2017/0355398 A1* | 12/2017 | Dix | B62D 15/025 | |
| 2017/0355402 A1* | 12/2017 | Huenemann | B60N 2/04 | |
| 2017/0357259 A1* | 12/2017 | Foster | A01B 69/00 | |
| 2017/0357267 A1* | 12/2017 | Foster | G05D 1/0088 | |
| 2017/0358852 A1* | 12/2017 | Foster | H01Q 1/3283 | |
| 2018/0108980 A1* | 4/2018 | Foster | H01Q 1/3233 | |

OTHER PUBLICATIONS

International Search Report and Written Opinion dated Oct. 24, 2017, 15 pages.

* cited by examiner

PROVIDING AUTO-GUIDANCE OF A MOBILE MACHINE WITHOUT REQUIRING A GRAPHICAL INTERFACE DISPLAY

BACKGROUND

Autopilot systems are used to control the trajectory that a vehicle travels without the human operator constantly having their hands on the steering wheel. An autopilot system does not replace the human operator but instead allows the human operator to focus on a broader spectrum of tasks.

Autopilot systems require sophisticated human operators to configure them and to interact with them using, for example, some type of graphical user interface display, such as a touch screen. For example, the sophisticated human operators need to read long and complicated user manuals that describe, among other things, how to install optical sensors, perform various operations using the graphical user interface display such as tare calibration, flow calibration, pitch/roll calibration, weight test, enter the type of crop that will be harvested, create variety maps of the field, monitor displayed statistics, enter the type of the vehicle, the offset from the axle to the antenna, the antenna height, the wheel base, select antenna type, elevation mask, SNR mask, RTK base station information, radio frequency, among others. An expert may need to be hired to assist in training the human operator on how to interact with the graphical user interface display and on how best to configure the autopilot system.

The autopilot systems cost in the range of $10,000 to $50,000. These expensive autopilot systems come with higher end vehicles that cost anywhere from $300,000 to a $1,000,000 each. Further, these higher end vehicles and their corresponding expensive autopilot systems require a high level of user sophistication. Only very large and profitable farming establishments can afford these expensive autopilot systems and higher end vehicles. These types of vehicles and autopilot systems are frequently used in large commercial farms that have large fleets of vehicles.

Further, due to the complex nature and expense of these conventional autopilot systems and the vehicles, these conventional autopilot systems are typically integrated with the vehicle at the time that the vehicle is manufactured.

BRIEF DESCRIPTION OF THE DRAWINGS

The accompanying drawings, which are incorporated in and form a part of this application, illustrate embodiments of the subject matter, and together with the description of embodiments, serve to explain the principles of the embodiments of the subject matter. Unless noted, the drawings referred to in this brief description of drawings should be understood as not being drawn to scale. Herein, like items are labeled with like item numbers.

Figure 1A:
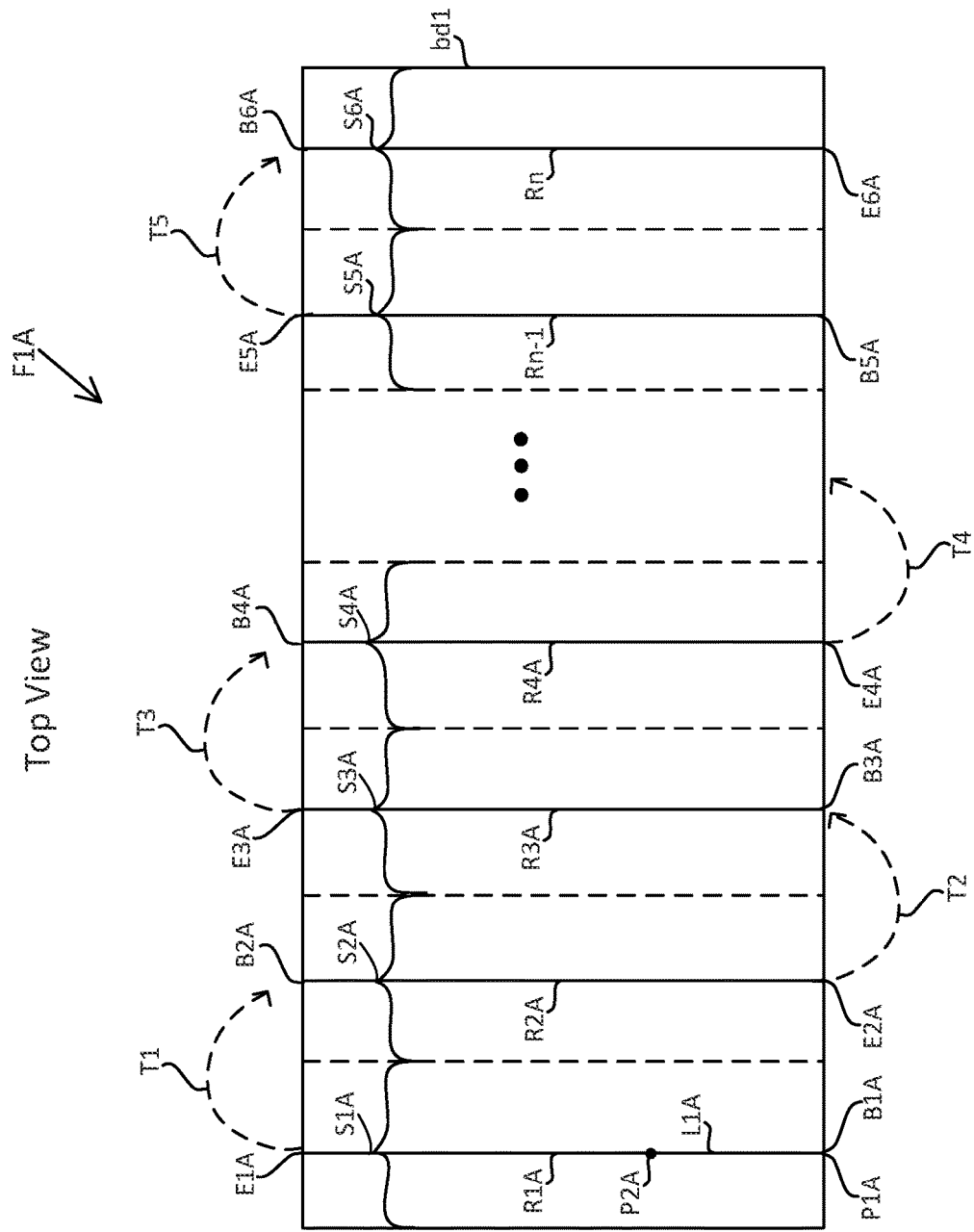
FIGS. 1A-1C depict three different types of rows and fields, according to various embodiments.

According to one embodiment, the method does not require does not require a graphical user interface display.

DESCRIPTION OF EMBODIMENTS

Notation and Nomenclature

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in the following Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Unless specifically stated otherwise as apparent from the following discussions, it is appreciated that throughout the description of embodiments, discussions utilizing terms such as "implementing," "setting," "engaging," "disengaging," "activating," "de-activating," "resuming," "receiving," "opening," "closing," "auto-guiding," "locating," "translating," "interpreting," "generating," "actuating," "performing," "causing," "re-activating," "repeating," "recording," "guiding," "transforming data," "modifying data to transform the state of a computer system," or the like, refer to the actions and processes of a computer system, data storage system, storage system controller, microcontroller, hardware processor, such as a central processing unit (CPU), or similar electronic computing device or combination of such electronic computing devices. The computer system or similar electronic computing device manipulates and transforms data represented as physical (electronic) quantities within the computer system's/device's registers and memories into other data similarly represented as physical quantities within the computer system's/device's memories or registers or other such information storage, transmission, or display devices.

With respect to the discussion throughout herein, it should be noted that the terms "parallel" and "substantially parallel" are used interchangeably herein and meant to be synonymous. The terms "parallel" and "substantially parallel" are not meant to be construed as linearly parallel, but instead to describe rows, lines, paths, or other entities that are a substantially fixed offset distance from one another. A "fixed offset distance" or "offset by a fixed distance" between side-by-side parallel entities is, in practice, a "substantially fixed offset distance" or an "offset by a substantially fixed distance" within the performance capability of an auto-guidance system and/or autopilot operation system for guiding a mobile machine over the terrain. Any variance from being perfectly parallel/perfectly fixed in offset distance will be small and within several centimeters in most, if not all, instances. Thus, it is accepted that variances in terrain, variances in steering responsiveness of the mobile machine, or limitations in navigation precision, among other factors, may cause rows, paths, lines, etc. to be slightly divergent from being perfectly parallel and, as used herein, the terms "parallel," "substantially parallel," "fixed offset," and "substantially fixed offset" are meant to encompass these minor variances. What is meant by the term "path" herein is a line from a first point (e.g., a beginning point) to a second point (e.g., an end point) that is not necessarily linear. That is, the path between the first point and the second point may be a linear path or may be a non-linear path that includes one or more curved portions between the start point and the end point. The path between the first point and the second point is also referred to herein as a "line," an "AB path," or a "path subset." Herein, a second row, line, or path that is side-by-side with a first path may substantially parallel the first row, line, or path by maintaining a substantially fixed offset distance from the first row, line, or path.

Overview

Mobile machines are used to process fields, for example, by plowing, seeding, fertilizing, spraying insecticides, mowing, and harvesting. Some examples of mobile machines used in an agricultural environment are tractors, trucks, swathers, sprayer vehicles, and combines, among others. Some examples of implements that can be attached to the mobile machines are plows, cultivators, cutting heads, seeders, planters, mowers, sprayers, fertilizers, rakes, balers, and wagons, among others.

The operation of the mobile machines can be complex requiring the human operator to be performing many tasks, such as raising and lowering booms and starting, stopping, and monitoring various operations. Further, these mobile machines are typically very large and potentially dangerous. The human operator must pay close attention and coordinate all of the complex tasks safely.

To simplify the human operator's job, the mobile machines may include an auto-guidance system that steers the mobile machine allowing the human operator to tend to other tasks such as raising and lowering booms, starting and stopping various operations. Conventional auto-guidance systems incorporate graphical user interface displays that allow the human operator to communicate with the auto-guidance system. However, as discussed herein, conventional auto-guidance systems are very expensive, and, therefore, are used in only extremely expensive mobile machines in highly profitable large farming establishments.

However, owners of smaller less profitable farms may also want or need an auto-guidance system. For example, an owner of a 50 acre farm in an emerging market, such as South America or Sub-Saharan Africa, may want an auto-guidance system for their 15 year old $2500 tractor to make it feasible or easier for their 12 year old son to operate the tractor freeing up the older members of the family to engage in other activities for making a living.

As can be seen, the owners of these smaller less profitable farms cannot afford the extremely expensive upper end mobile machines with the expensive conventional auto-guidance systems. Further, their mobile machines may be very old and inexpensive. Their mobile machine may not have any auto-guidance system in it at all and it may not be economically or technologically feasible to add a conventional auto-guidance system to their mobile machine. The owners may not know English and may not even be able to read their native language. Therefore, reading user manuals and interacting with a graphical user interface is not feasible.

The main cost of conventional auto-guidance systems is the graphical user interface display. Therefore, various embodiments provide an autopilot operation system that does not require a graphical user interface display. According to one embodiment, the autopilot operation system uses one or more electromechanical switches instead of the graphical user interface display. Electromechanical switches are much cheaper than graphical user interface displays. Further, various embodiments provide for adding an auto-guidance system to a mobile machine after the mobile machine was manufactured.

Various embodiments provide for easily adding an inexpensive auto-guidance system to a mobile machine that was manufactured without an auto-guidance system. For example, various simple mechanical methods can be used for coupling the autopilot operation system with the mobile machine, such as a bracket, a screw, a screw hole, a male portion or female portion of a snap-on mounting system, a hole or a knob that can be inserted into a hole and twisted, spare parts, and duct tape that are generally available. According to one embodiment, standard methods of adherence using tools that are generally available can be used for coupling the autopilot operation system with the mobile machine.

Further, according to one embodiment, a human operator of the mobile machine can configure, activate and deactivate the auto-guidance system simply by pressing a physical button, such as an electromechanical switch. Therefore, as can be seen, various embodiments provide auto-guidance of a mobile machine without requiring training the human operator on auto-guidance, without requiring an auto-guidance user interface, without requiring the human operator or the owner of the mobile machine to have an auto-guidance skill set, without requiring the human operator or the owner of the mobile machine to have knowledge about auto-guidance. For example, as can be seen, various embodiments enable all human interactions, conducted post manufacturing, with the auto-guidance system to be performed solely with one or more electromechanical switches. Further, as can be seen, various embodiments enable performing all human interactions with the auto-guidance system of a mobile machine solely with one or more electromechanical switches of the auto-guidance system while operating the mobile machine, such as farming a field. Various embodiments provide an auto-guidance system where the only way to interact with the auto-guidance system while the mobile machine is operating is via the one or more electromechanical switches. Various embodiments provide an auto-guidance system that requires a human operator interaction with the one or more electromechanical switches while the mobile machine is operating. In other words, without a human operator interacting with the auto-guidance system via the one or more electromechanical switches during operation of the mobile machine, the mobile machine will operate in as if there were no auto-guidance system (also known as "non-auto-guidance mode").

Therefore, various embodiments provide an auto-guidance system for a mobile machine without requiring a graphical user interface display, a user manual, without requiring the owner or human operator of the mobile machine to be able to read, without requiring a sophisticated human operator, without requiring the human operator to understand or be familiar with GPS/GNSS terminology, without requiring any parts of the auto-guidance system to be hardwired into the hydraulic system, without requiring any of the auto-guidance system to be installed into the mobile machine at the time the mobile machine is manufactured, without requiring the owner to pay an expert for training, for configuring or for interacting with the auto-guidance system, without requiring the owner or human operator to interact or configure the auto-guidance system beyond the use of interacting with one or more electromechanical switches, without requiring the owner of the mobile device to hire someone (also known as a "third party") to install the auto-guidance system, without requiring any human to configure or interact with the auto-guidance system after the auto-guidance system has been manufactured beyond the use of interacting with one or more electromechanical switches, and without requiring an operator or an owner to know how to interact with a computer, a touch screen, or a generalized user interface.

Fields, Rows, Paths and Set Points

Figure 1B:
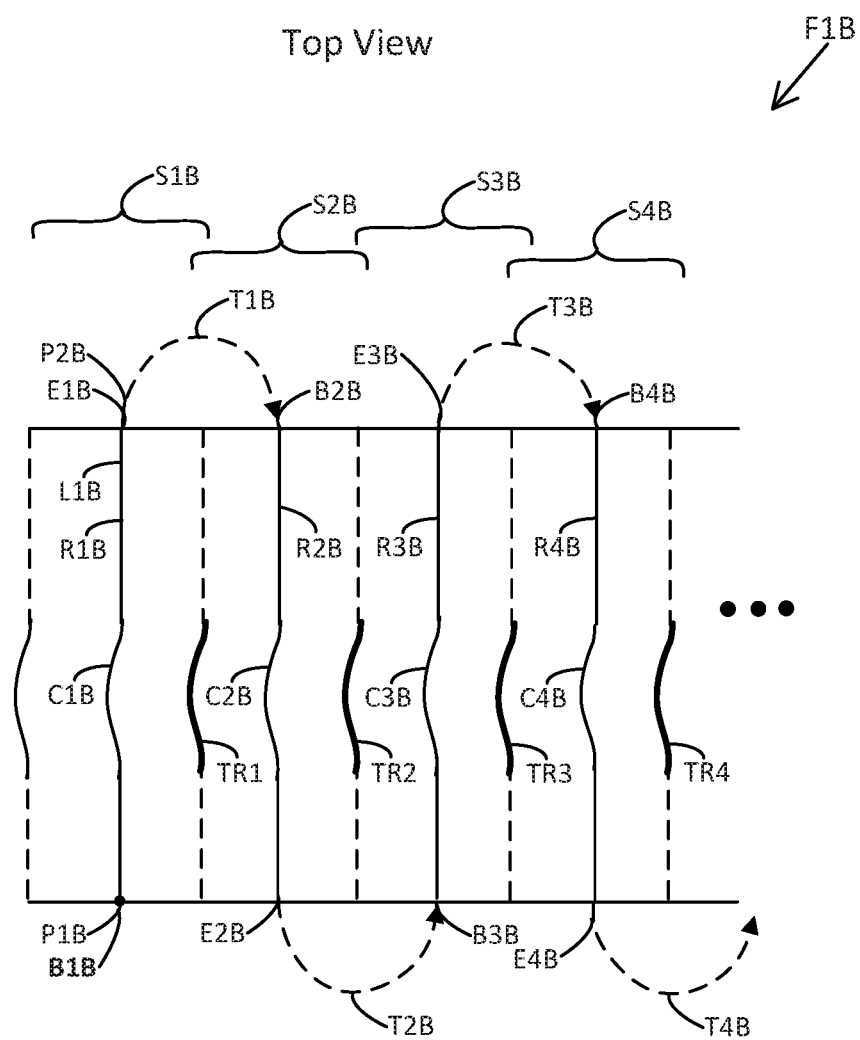
Figure 1C:
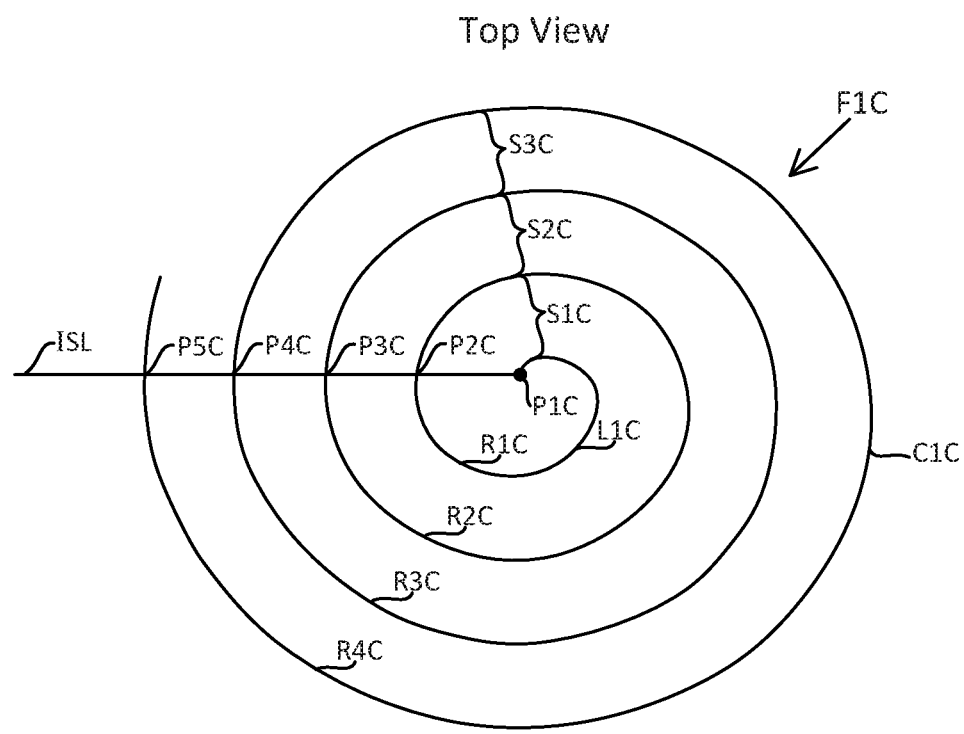

There are various types of rows and fields. FIGS. 1A-1C depict three different types of rows and fields, according to various embodiments. Embodiments are well suited to other types of rows and fields.

FIG. 1A depicts a top view of a rectangular field F1A where all of the rows R1A, R2A, R3A, R4A, Rn-1, and Rn are straight paths. Each row R1A, R2A, R3A, R4A, Rn-1, and Rn has a respective beginning point B1A, B2A, B3A, B4A, B5A, B6A and a respective ending point E1A, E2A, E3A, E4A, E5A, E6A. The field F1A may be square or rectangular. A square is interpreted to be a type of rectangle. The four lines that depict the rectangular field F1A in FIG. 1A define the boundary BD1 of the field F1A. The path L1A along the first point P1A and the second point P2A is at least a subset of a row R1A. For example, the first point P1A may be located at the beginning B1A of the row R1A or somewhere along row R1A and the second point P2A may be located along R1A between point 1A and at or before the end E1A of the row R1A.

A current row and an immediately subsequent row are adjacent and parallel to each other. For example, rows R1A and R2A are adjacent to and parallel with each other. Rows R2A and R3A are adjacent to and parallel with each other. Rows R3A and R4A are adjacent to and parallel with each other and so on through row Rn-1 and row Rn.

The rows R1A, R2A, R3A, R4A, Rn-1, and Rn can also be referred to as "paths." A mobile machine can move along the turns T1A, T2A, T3A, T4A, and T5A to move from one row to the next row in the field F1A. For example, a mobile machine may move along turn T1A after finishing row R1A in order to start row R2A and so on.

FIG. 1B depicts a top view of a field F1B that has one or more contoured surfaces, according to one embodiment. Examples of a contoured surface are a hill, an upward slope and a downward slope. The slope may be near a tree or a creek, for example. The field F1B has rows R1B, R2B, R3B, and R4B. Each row R1B, R2B, R3B, and R4B has a respective beginning point B1B, B2B, B3B, and B4B and a respective ending point E1B, E2B, E3B, and E4B. A mobile machine can move along the turns T1B, T2B, T3B, and T4B to move from one row to the next row in the field F1B. For example, a mobile machine may move along turn T1B after finishing row R1B in order to start row R2B and so on.

Each of the rows R1B, R2B, R3B, and R4B include a respective curved path subset C1B, C2B, C3B, and C4B in the vicinity of a contoured surface. The curved path subsets C1B, C2B, C3B, and C4B are each associated with a respective terrace TR1, TR2, TR3, and TR4 that are depicted with heavier lines. An entire curved path subset C1B, C2B, C3B, and C4B may or may not be approximately at the same elevation. Instead of terraces TR1, TR2, TR3 and TR4, there may be obstacles in those locations where the curved path subsets C1B, C2B, C3B, and C4B avoid the obstacles, according to one embodiment. According to one embodiment, the curved path subsets C1B, C2B, C3B and C4B may be arbitrary deviations from what would have been a straight row R1B, R2B, R3B, R4B. For example, the curved path subsets C1B-C4B may occur even when there is no obstacles or contoured surfaces.

According to one embodiment, the first point P1B is at the beginning B1B of the row R1B and the second point P2B are at the end E1B of the row R1B, according to one embodiment. Therefore, the path L1B that is used for auto-guidance includes the entire first row R1B for the field F1B, according to one embodiment. The first point P1B is set when the mobile machine starts the row R1B and the second point P2B is set when the mobile machine has completed the same row R1B. The rows R1B, R2B, R3B and R4B may also be referred to as paths.

A current row and an immediately subsequent row are adjacent and parallel to each other. For example, rows R1B and R2B are adjacent to and parallel with each other. Rows R2B and R3B are adjacent to and parallel with each other and so on for all of the rows in the field F1B. The rows can also be referred to as "paths."

FIG. 1C depicts a top view of a field F1C with one continuous spiraling row C1C that starts in the middle P1C, according to one embodiment. The spiral has paths R1C, R2C, R3C, and R4C that turn. An imaginary straight line ISL with one end located at the center P1C of the spiral C1C and the other end P5C located on the outermost turn of the spiral C1C can be used to define the paths R1C, R2C, R3C, and R4C. For example, the first path R1C of the spiral C1C can start at the center P1C and end P2C where the imaginary straight line ISL first intersects the spiral C1C. The second path R2C of the spiral C1C can start P2C where the imaginary straight line ISL first intersects the spiral and end P3C where the imaginary line intersects the spiral C1C for a second time. The third path R3C of the spiral C1C can start where the imaginary straight line ISL intersects the spiral C1C for the second time P2C and end P3C where the imaginary line intersects the spiral the third time and so on. Each of the turn or path R1C, R2C, R3C, R4C can be treated as a row. Various embodiments are well suited to drawing the imaginary straight line in other directions for the purpose of defining paths. For example, the imaginary straight line may be drawn in any direction. The imaginary straight line was drawn perpendicularly to the left only for the purposes of illustration.

A current path and an immediately subsequent path are adjacent and parallel to each other. For example, paths R1C and R2C are adjacent to and parallel with to each other. Paths R2C and R3C are adjacent to and parallel with to each other. Paths R3C and R4C are adjacent to and parallel with to each other and so on for all of the paths of the field F1C. According to one embodiment, the first point is P1C and the second point is P2C. Therefore, according to one embodiment, the path L1C that is used for auto-guidance for field F1C starts at the middle P1C of the spiral and ends at P2C.

The width of an implement defines what is known as a "swath" in a field. For example, FIG. 1A depicts the swaths S1A, S2A, S3A, S4A, S5A, and S6A of field F1A. FIG. 1B depicts the swaths S1B, S2B, S3B of field F2B. FIG. 1C depicts the swaths S1C, S2C, S3C of field F1C. Each row or path is located at the center of a swath since the middle of the implement would be centered on a row as the mobile machine with the attached implement is moving down a row. For example, referring to FIG. 1A, row R1A is in the middle of swath S1A, row R2A is in the middle of swath S2A. The width of the implement is used to reduce the possibility of gaps between adjacent paths or that any portions of the adjacent paths overlap each other. Various embodiments are also well suited for asymmetrical implements. For example, the geometry of the asymmetrical implement can be used to determine the orientation of a row with respect to that implement. The geometry of the asymmetrical implement can be stored where swath information is stored as described herein.

A path L1A, L1B, L1C along the first point and the second point may be a straight path, as depicted in FIG. 1A, or a non-straight path, as depicted in FIG. 1B or FIG. 1C. According to one embodiment, a straight path provides a trajectory for the auto-guidance system. According to one embodiment, either a straight path or a non-straight path provides a pattern to follow for a subsequent path that is the distance of an implement from the previous path where the two paths are adjacent to and parallel with each other.

Autopilot Operation System that does not Require a Graphical User Interface Display FIGS. 2A-2E depict block diagrams of various autopilot operation systems that do not require a graphical user interface display, according to various embodiments.

Figure 2A:
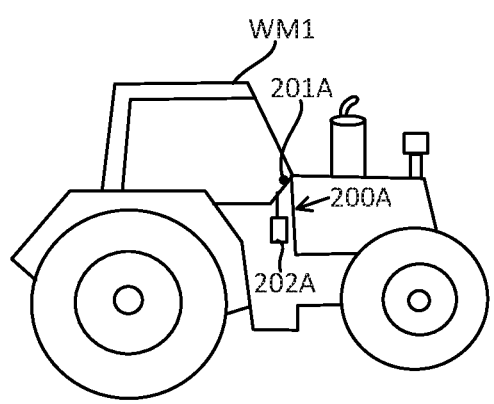
FIGS. 2A-2E depict block diagrams of various autopilot operation systems that do not require a graphical user interface display, according to various embodiments.

FIG. 2A depicts a block diagram of an autopilot operation system 200A that is part of a mobile machine WM1, according to one embodiment.

As depicted, the mobile machine WM1 is a tractor. However, embodiments are well suited for other types of mobile machines used in an agricultural environment, such as trucks, swathers, sprayer vehicles, and combines, among others.

The autopilot operation system 200A depicted in FIG. 2A includes an auto-guidance system 202A and an electromechanical switch 201A that are communicatively coupled with each other. Embodiments are well suited for using a single electromechanical switch 201A or more than one electromechanical switch, as will become more evident.

Figure 2B:
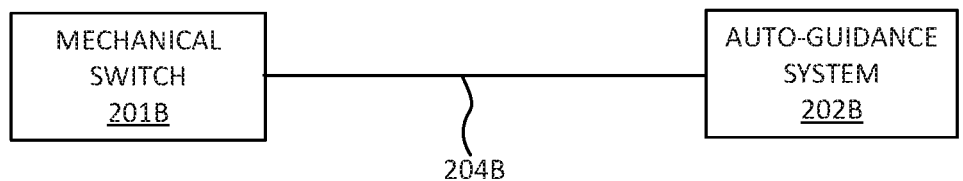
Figure 2C:

FIGS. 2B-2C depict block diagrams of autopilot operation systems with various types of communication coupling between the auto-guidance system and the electromechanical switch, according to various embodiments. For example, FIG. 2B depicts an autopilot operation system 200B that includes an electromechanical switch 201B and an auto-guidance system 202B. As depicted in FIG. 2B, the electromechanical switch 201B are coupled directly with the auto-guidance system 202B. As depicted in FIG. 2B, the switch 201B is coupled directly with the auto-guidance system 202B using a communications line 204B. The communications line 204B may be a CAN (Controller Area Network) bus.

Referring to FIG. 2C, an autopilot operation system 200C can also include translation-logic 203C (also known as "signal-to-can-message-translation-logic" or "CAN translation-logic") that translates the electromechanical switch inputs from an electromechanical switch 201C into CAN (Controller Area Network) messages that are delivered to the auto-guidance system 202C over a CAN bus of the mobile machine. The CAN translator logic 203C can translate a signal from the electromechanical switch 201C into a CAN message that the auto-guidance system 202C is capable of interpreting and responding to appropriately. The CAN translation-logic 203C can be between the auto-guidance system 202C and the electromechanical switch 201C as depicted in FIG. 2C. Although FIG. 2C depicts the translator logic 203C outside and between the mechanical switch 201C and the auto-guidance system 202C, various embodiments are well suited to the translator logic being inside of the mechanical switch.

Although CAN messages may be used, embodiments are well suited for other types of communications, such as RS-232, transmission communication protocol/internet protocol (TCP/IP), Wi-Fi or Bluetooth.

Figure 2D:
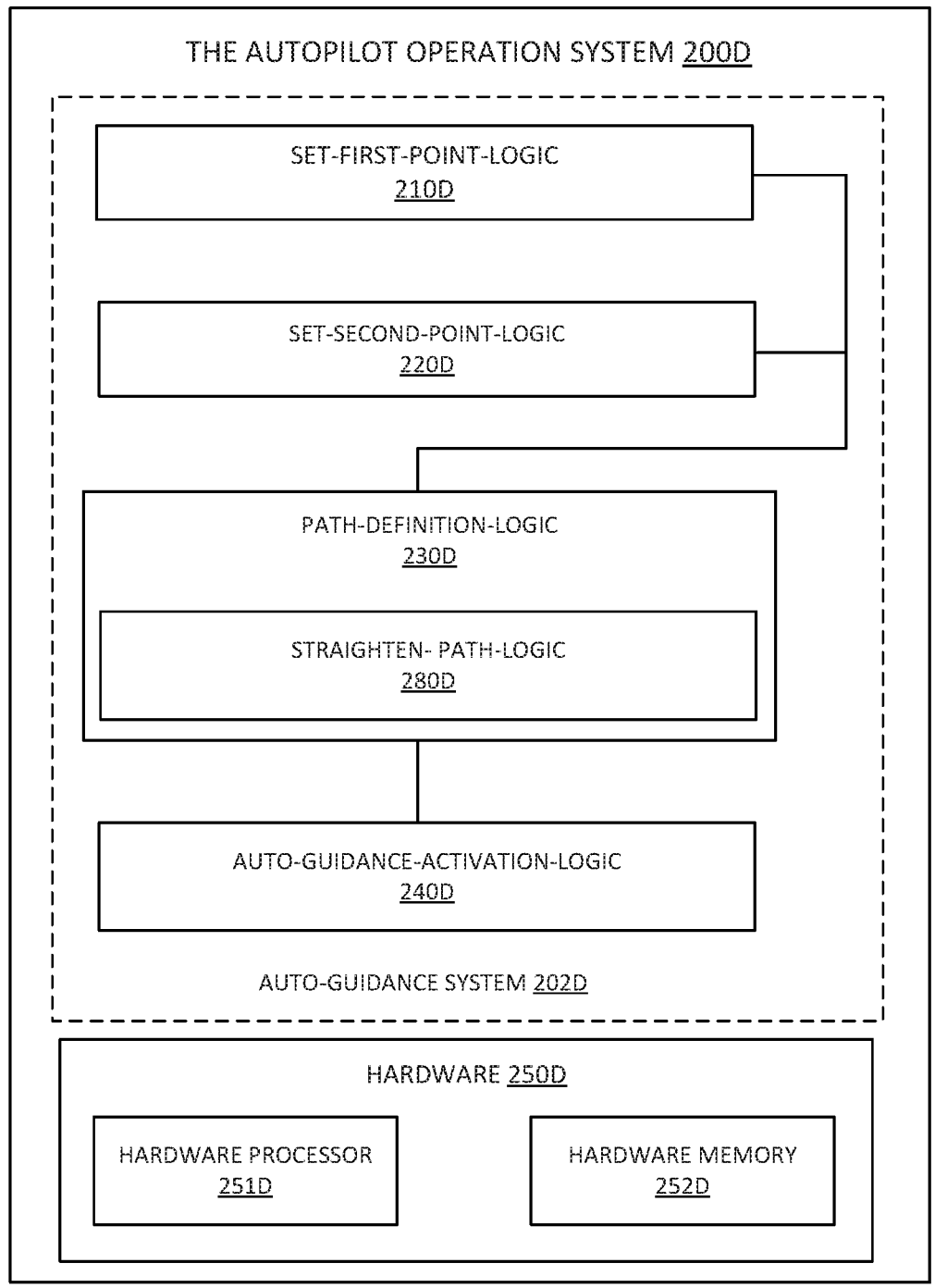

FIG. 2D depicts a block diagram of an autopilot operation system 200D of a mobile machine that does not require a graphical user interface display, according to one embodiment.

The autopilot operation system 200D includes set-first-point-logic 210D (also referred to as "first-point-auto-guidance-system-setting-logic"), set-second-point-logic 220D (also referred to as "second-point-auto-guidance-system-setting-logic"), path-definition-logic 230D (also referred to as "definition-of-path-between-first-point-and-second-point-logic"), and auto-guidance-activation-logic 240D (also referred to as "auto-guidance-system-activating-logic"). The autopilot operation system 200D can optionally include straighten-path-logic 280D (also referred to as "straighten-path-between-first-point-and-second-point-logic"). The set-first-point-logic 210D and the set-second-point-logic 220D are coupled with the path-definition-logic 230D. The path-definition-logic 230D is coupled with the auto-guidance-activation-logic 240D. The autopilot operation system 200D may optionally include hardware 250D that includes one or more hardware processors 251D and one or more of hardware memory 252D. Auto-guidance system 202D comprises some or all of logic 210D, logic 220D, logic 230D, logic 240D, and hardware 250D, and may additionally include logic 280D. Autopilot operation system 200D is an example of a special purpose computer system. In some embodiments, autopilot operation system 200D may further include one or more switches 201.

The set-first-point-logic 210D sets a first point for auto-guidance of the mobile machine in response to receiving a first electromechanical switch input. The set-second-point-logic 220D sets a second point for auto-guidance of the mobile machine in response to receiving a second electromechanical switch input after movement of the mobile machine from the first point. The path-definition-logic 230D defines a path along the first point and the second point. The auto-guidance-activation-logic 240D activates auto-guidance of the mobile machine along the path.

The autopilot operation system 200D can optionally include path or row straightening logic (also known as "straighten-path-logic 280D") that, for example, analyzes the Global Positioning System (GPS) or Global Navigation Satellite System (GNSS) locations between the first point and the second point, determines based on the analysis whether the human operator intended to drive in a straight path, determines a straight path if the analysis indicates the intention was to drive a straight path, or determines to use the actual GPS or GNSS locations if the determination was to not drive a straight path, and if a straight path is determined, uses the determined straight path as the path between the first point and the second point for the purposes of auto-guidance.

A threshold can be used to determine whether to straighten the path. For example, the system 200D could determine whether the curve was intentional based on whether the side-to-side offset is greater than some significant proportion of the implement's width, or if the curvature of the deviation was greater than some threshold. An example of a threshold is approximately 2 meters with a range of approximately 1.5 meters to 2.5 meters. Other smaller or larger thresholds and ranges are possible and anticipated.

The straighten-path-logic 280D may be a part of logic 230D, as depicted in FIG. 2D, or separate from logic 230D. A variation in a straight path between the first point and second point may be automatically straightened by straightening logic 280D, for example, when the variation from does not exceed the predetermined threshold.

Figure 2E:
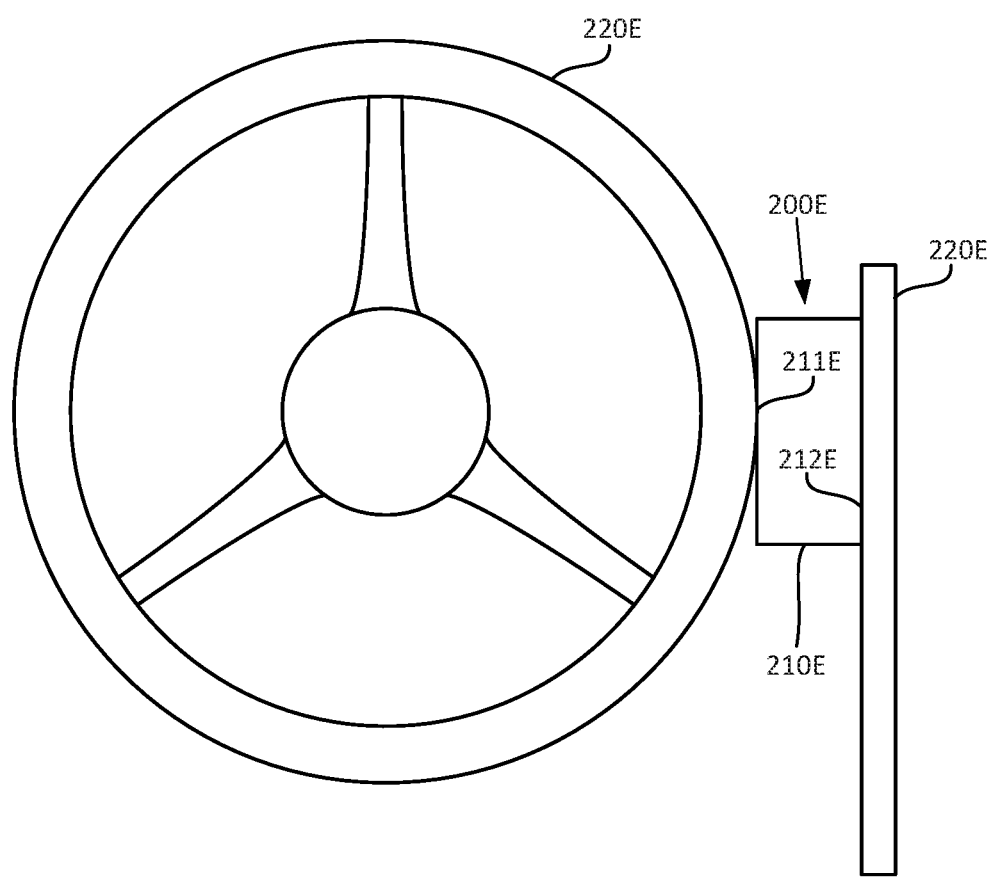

Embodiments described herein may be implemented with any type of autopilot operation system. For example, FIG. 2E depicts an autopilot operation system 200E of a mobile machine that does not require a graphical user interface display, according to one embodiment. The autopilot operation system 200E can include features from one or more of 200A, 200B, 200C, or 200D. As depicted in FIG. 2E, the autopilot operation system 200E includes a case 210E with two opposing sides 211E and 212E. In one embodiment, the autopilot operation system 200E could include 200A, 200B, or 200C, for example, inside of the case 210E. Alternatively, the case 210E could include just the friction bearings while the other parts of the autopilot operation system are located elsewhere, as discussed herein. In yet another embodiment, the case 210E could include the friction bearings and one or more electromechanical switches. Various parts of the autopilot operation system can communicate via wired communications or wireless communications. For example, parts that are located inside of the case 210E could communicate using wired or wireless communications with other parts of the autopilot operation system that are located elsewhere.

As depicted in FIG. 2E, one side 212E of the case 210E is coupled with a stabilizing brace 220E while the other side 211E of the case 210E is abutted against the steering wheel 230E of the mobile machine WM1. The brace 220E holds case 210E in place against the outer surface of the wheel 230E. A lever, according to one embodiment, is coupled with the brace 220E to move the case 210E so that side 211E is abutted against the steering wheel 230E and to move the case 210E away from the steering wheel 230E.

The autopilot operation system 200E, according to one embodiment, includes friction bearings, such as wheels or balls, which press against the outer surface of the wheel 230E. The friction bearings may partially wrap around the outer surface of the wheel 230E. The case 210E may be coupled with a vice scrip wrench that is used to securely press the friction bearings against the outer surface of the wheel 230E. The auto-guidance system 202A-202C of the autopilot operation system 200E directs the friction bearings, according to one embodiment, to turn clockwise or counter clock wise. When the friction bearings turn clockwise, the wheel 230E will turn to the right and when the friction bearings turn counter clockwise, the wheel 230E will turn to the left.

According to another embodiment, the autopilot operation system may use friction bearings that are abutted against the shaft of the steering wheel instead of against the steering wheel itself. According to other embodiments, the autopilot operation system may control the steering by physically connecting with or interacting with a hydraulic steering system of the mobile machine.

According to one embodiment, the autopilot operation system 200A-200E obtains power from the battery of the mobile machine or from another battery.

Various methods can be used to couple an autopilot operation system 200A-200E with a mobile machine. For example, the autopilot operation system could be coupled with a brace, as depicted in FIG. 2E, on a switch panel (also known as a "console"), on the floor, on the steering wheel, on a joy stick. The friction bearings could be abutted against the steering wheel or against the steering wheel shaft.

Various simple mechanical methods of coupling can be used for coupling the autopilot operation system with the mobile machine, such as a bracket, a screw, or the like.

An autopilot operation system 200A, 200B, 200C, 200D, 200E does not require a graphical user interface display, according to various embodiments. Further, the various features depicted and/or described in the context of FIGS. 2A-2E can be combined or used separately to provide an autopilot operation system. Any of the auto-guidance systems described herein, could be implemented as an auto-guidance system 202D.

The blocks that represent features in FIGS. 2A-2E can be arranged differently than as illustrated, and can implement additional or fewer features than what are described herein. Further, the features represented by the blocks in FIGS. 2A-2E can be combined in various ways. A system, as depicted in FIGS. 2A-2E, can be implemented using software, hardware, hardware and software, hardware and firmware, or a combination thereof. Further, unless specified otherwise, various embodiments that are described as being a part of a system depicted in FIGS. 2A-2E, whether depicted as a part of the system or not, can be implemented using software, hardware, hardware and software, hardware and firmware, or a combination thereof.

Operations

Examples of operations include engaging autopilot, disengaging autopilot, activating autopilot, de-activating autopilot, resuming autopilot, setting a first point, setting a second point, and nudging the movement of the mobile machine closer to a desired row or path.

According to one embodiment, "engaging" or "engaged" means that the auto-guidance is turned on but not actively performing auto-guidance. According to one embodiment "active" means the auto-guidance is on and performing auto-guidance. The nudge operation can be used, for example, to avoid over steering with the manual steering wheel by slightly moving (also referred to as "nudging") the mobile machine to the left or the right. Resuming means re-activating autopilot that was previously de-activated. For example, autopilot may be de-activated at or near the end of a row. According one embodiment, deactivation can be performed automatically, even without a human operator interacting with an electro mechanical switch, in response to detecting that the human operator has started to turn the wheel. Autopilot may be resumed after the human operator turns the work machine around and approaches the beginning of a subsequent row or path. Activation could be interpreted as a resume after the autopilot has been de-activated.

Electromechanical Switch

An electromechanical switch may be any type of mechanical mechanism that can be physically actuated from one position to another position to close and/or open an electrical circuit for setting a first electromechanical switch input and a second electromechanical switch input as described herein. For example the electromechanical switch may be, among other things, a physical button, physical lever, physical pedal, or a physical dial that a human operator can physically interact with by, for example, pushing, moving, or turning. An electromechanical switch could be an off the shelf electromechanical switch. According to one embodiment, a single electromechanical switch or more than one electromechanical switch can be used to initiate any operation, as described herein, by generating an electromechanical switch input. In one embodiment the electromechanical switch has at least one set of contacts, connected to an external circuit or circuits, which can be opened and closed using manual movement initiated by a human. Actuation of an electromechanical switch changes a state of the switch (e.g., completes or opens a circuit). An electrical signal is generated in response to the completion of the circuit. The generated electrical signal is an example of an electromechanical switch input.

An electromechanical switch can be located in various places of a mobile machine. For example, an electro mechanical switch may be part of an autopilot operation system 200E, as depicted in FIG. 2E, such that part of it is inside of the case 210E and part of it is exposed for human interaction. An electromechanical switch may be located on the floor, on the steering wheel, on a joystick, or on a switch panel (also known as a "console"). The electromechanical switch may be a pedal on the floor, a button or lever on a steering wheel, a joystick or on the console of the mobile machine. The electromechanical switch may be located in a previously unused area of the switch panel. The unused area is also known as a "knock out" of the switch panel. The one or more electromechanical switches can be used to perform various operations described herein.

Figure 3A:
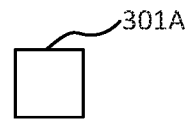
FIGS. 3A-3E depict various types and numbers of electromechanical switches, according to various embodiments.

FIG. 3A depicts a single electromechanical switch 301A, according to one embodiment. In the event that a single electromechanical switch 301A that is, for example, a physical pedal or physical button, the pedal or button can be physically pressed to set the first point. The pedal or button can be held down as the mobile machine moves from the first point to the second point and released when the mobile machine is at the second point. Releasing the pedal or button can set the second point. In another example, referring to FIGS. 1A and 1B, a quick press and release of the single electromechanical switch 301A can be used to set the first point. That same quick press and release that is used to set the first point or a previous quick press and release of the single electromechanical switch 301A could be used to engage the auto-guidance. Still referring to FIGS. 1A and 1B, another quick release of the single electromechanical switch 301A can be used to set the second point. Referring to FIG. 1C, physically holding the single electromechanical switch 301A down into a locked state can be used for recording a path along a first point and second point. In one embodiment, a quick press and release, as described herein, takes less than three seconds.

Figure 3B:

FIG. 3B depicts two electromechanical switches 301B and 302B, according to one embodiment. In this case, one electromechanical switch 301B can be used to engage and disengage the autopilot and a second electromechanical switch 302B can be used to set the first point and the second point by physically toggling the switches or by quickly pressing and releasing the switches. Actuating the second electromechanical switch 302B can engage auto-guidance at the same time that the first point is set. In another example, a first point can be set by physically pressing and holding a button down and the second point can be set by physically releasing the button. In yet another example, the first point can be set by one quick press and release and the second point can be set by another quick press and release of the button. Engage and disengage can be performed in a similar manner. In another example, one electromechanical switch 301B can be used to set the first point and the other electromechanical switch 302B can be used to set the second point. In still another example, one electromechanical switch 301B can be used to set both the first point and the second point, as discussed herein, and the other electromechanical switch 302B could be used for a nudge operation. The nudge operation can be used, for example, by an operator to make manual steering adjustments to the otherwise autopilot operation. Assuming that the electromechanical switch 302B is a lever, the lever could be physically moved in one direction to nudge movement of the mobile machine to the left and physically moved in the other direction to nudge the movement of the mobile machine to the right. A dial may be used instead of a lever for the nudge operation.

Figure 3C:
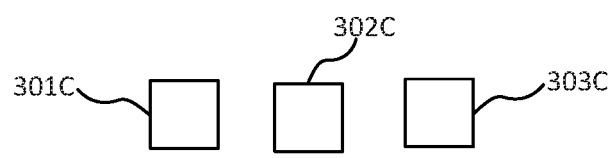

FIG. 3C depicts three electromechanical switches 301C, 302C, and 303C, according to one embodiment. In this case, one electromechanical switch 301C can be used to engage and disengage the autopilot, a second electromechanical switch 302C can be used to set the first point and the second point, a third electromechanical switch 303C can be used for the nudge operation.

Figure 3D:
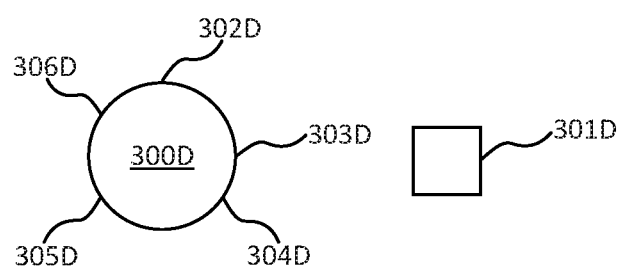

FIG. 3D depicts two electromechanical switches 300D and 301D, according to one embodiment. One of the electromechanical switches 300D is a dial with positions 302D, 303D, 304D, 305, and 306D where each position 302D-306D can be used to specify an operation. Embodiments are well suited to more or fewer positions for the dial. Examples of operations 302D-306D are set a first point, set a second point, engage, disengage, and nudge. The other switch 301D may be a button or lever, for example, to actuate the operation. Assuming that the electromechanical switch 301D is a lever, physically moving the lever in one direction can start the selected operation and physically moving the lever in the other direction can stop the operation. Further, assuming that the electromechanical switch 301D is a lever, the lever could be physically moved in one direction to nudge movement of the mobile machine to the left and physically moved in the other direction to nudge the movement of the mobile machine to the right.

Figure 3E:
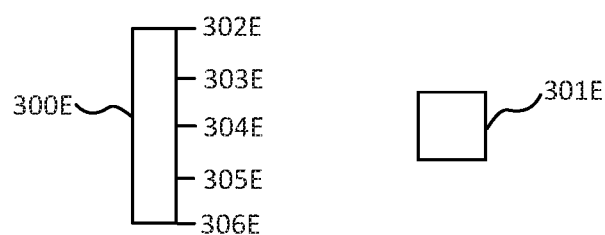

FIG. 3E depicts two electromechanical switches 300E and 301E. One of the electromechanical switches 300E is a lever with positions 302E, 303E, 304E, 305E, and 306E where each position 302E-306E can be used to specify an operation, as discussed herein. The human operator can select a position by physically moving the lever to that position. Embodiments are well suited to additional or fewer positions for the lever. The other electromechanical switch 301E may be, for example, a button or a lever to engage the operation. Assuming that the electromechanical switch 301E is a lever, physically moving the lever in one direction can engage the selected operation and physically moving the lever in the other direction can disengage the operation. Further, assuming that the electromechanical switch 301E is a lever, the lever could be physically moved in one direction to nudge movement of the mobile machine to the left and physically moved in the other direction to nudge the movement of the mobile machine to the right.

According to one embodiment, the electromechanical switches depicted in FIGS. 3A-3E are part of an autopilot operation system 200E (FIG. 2E). For example, a human operator of the mobile machine can physically interact with a portion of one or more electromechanical switches that is exposed outside of the case 210E.

The dial or the lever could also have positions for activate, de-activate, and resume. According to one embodiment, an activation electromechanical switch or an activate position for a dial or lever can be interpreted as resume, for example, after the autopilot was de-activated. One of a plurality of multiple electromechanical switches could be used for a resume operation.

Any action, such as actuating an electromechanical switch, that sets a first point could be used to engage the auto-guidance, for example, prior to setting the first point.

Controller Area Network (CAN) Messages

The electrical signals generated as the result of the one or more electromechanical switches can be translated into CAN messages. Various operations as discussed herein can be translated into and/or communicated using CAN messages. For example, the engage autopilot, the disengage autopilot, activate autopilot, deactivate autopilot, resume autopilot, set first point, set second point, and nudge operations can each be translated into respective CAN messages by CAN translator logic 203C. The respective CAN messages can be delivered to the auto-guidance system 202B, 202C over a CAN bus 204B, 204C of the mobile machine.

In another example, the implement attached to the work machine may transmit a CAN message with the implement's width to the autopilot operation system.

According to one embodiment, the mobile machine includes a CAN bus that can be used to transmit "CAN messages" from one entity to another. For example, the CAN bus can transmit a CAN message from translator logic 203C to an auto-guidance system 202C or from an implement to an autopilot operation system or an auto-guidance system.

CAN messages can also be transmitted wirelessly. For example, an implement can transmit a CAN message that includes the implement's width wirelessly to an autopilot operation system or an auto-guidance system.

Although CAN messages may be used, embodiments are well suited for other types of communications, such as RS-232, transmission communication protocol/internet protocol (TCP/IP), Wi-Fi or Bluetooth.

Indicator

According to various embodiments, the autopilot operation system can include at least one visual indicator or audio indicator pertaining to status of an auto-guidance system that performs the auto-guidance of the mobile machine. The human operator can use the information to determine how to operate the mobile machine. The one or more indicators may include one or more visual indicators, such as a light, or one or more audio indicators, such as a speaker. The light may be a light emitting diode (LED). One or more indicators may provide information pertaining to any one or more of the various operations and/or electromechanical switches, as discussed herein. One indicator may be used to provide information for only one operation and/or one electromechanical switch. One indicator may be used to provide information for a plurality of operations and/or plurality of electromechanical switches.

Figure 4A:
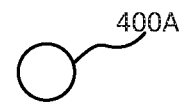
FIGS. 4A and 4B depict various types and numbers of indicators, according to various embodiments.

FIG. 4A depicts a single indicator 400A to provide information pertaining to the status of the operations, according to one embodiment. For example, a single indicator 400A that is a light associated with one or more electromechanical switches could be one color after the first point is set and a different color after the second point is set. Alternatively, the light 400A of the single electromechanical switch may be flashing when one of the points is set and solid when the other of the points is set. In yet another example, different patterns of flashing or sounds can be used to indicate different statuses. For example, one pattern of flashing or sound may indicate that the first point has been set, a second pattern of flashing or sound may indicate that the second point has been set, a third pattern of flashing or sound may indicate that the end of a row is approaching, and so on.

In yet another example, the single light indicator 400A may be off when the autopilot operation system is off, yellow when the autopilot operation system is deactivated, green when the autopilot operation system is activated, red or flashing when there is an error with the autopilot operation system, starts to flash blue after the first point is set and continues to flash blue while the mobile machine moves from the first point to the second point, and is a solid blue after the second point is set.

In still another example, a single indicator 400A that is a speaker can be used to produce audio such as "autopilot operation system is disengaged," "autopilot operation system is engaged," "autopilot operation system activated," "autopilot operation system deactivated," "autopilot operation system resumed," "autopilot operation system error," "first point set," "second point set," "end of row approaching," "at end of row," and/or "passed end of row." Various patterns of sounds or beeps could be used instead or in addition to words, phrases or visual indications. For example, no sound could mean disengaged, one beep could mean engaged, and so on.

Figure 4B:

Various embodiments are also well suited to using multiple indicators. FIG. 4B depicts multiple indicators 401B, 402B, 403B, and 404B, according to one embodiment. For example, one indicator 401B can pertain to whether the autopilot operation system is engaged or disengaged, a second indicator 402B can pertain to whether there is an error with the autopilot operation system, a third indicator 403B can indicate whether the first point was set, and a fourth indicator 404B can indicate whether the second point was set.

An indicator may be located near an electromechanical switch. For example, the single indicator depicted in FIG. 4A may be located near the single electromechanical switch of FIG. 3A. In another example, an indicator may be located near the electromechanical switch that the indicator provides information for. More specifically, an engage/disengage indicator may be located near an engage/disengage electromechanical switch, a set point indicator maybe located near a set point electromechanical switch and so on.

These are just examples of the types and numbers of indicators that can be used to provide information. Various embodiments are well suited for other types of information, other types of indicators, other numbers of indicators, and other types of colors and other words, phrases and/or patterns of sounds that can be heard from a speaker.

Although one or more indicators may be used according to various embodiments, one or more indicators are not required. For example, the human operator can feel when the mobile machine is or is not in auto-pilot mode.

Recorded Information

Information describing a path L1A, L1B, L1C (FIGS. 1A-1C) can be recorded as the mobile machine moves from the first point to the second point. An example of the recorded information is GPS or GNSS locations of the mobile machine (e.g., every foot, two feet, three feet, ten feet, etc.) as it moves from the first point to the second point. The recorded information can include the guidance paths, such as L1A, L1B, L1C, and the field boundaries, such as bd1. The information can be recorded in the autopilot operation system's hardware memory 252D. The information may be recorded remotely, for example, in hardware memory that can be accessed with a data connection. The hardware memory may be on the cloud instead of part of the autopilot operation system. The recorded information can be used to autopilot the mobile machine for subsequent paths in a manner that all of the paths are parallel with respect to each other and avoid gaps between two adjacent paths and avoid overlaps between two adjacent paths. The recorded information can also include the width of an implement, such as a plow, sprayer, planter or wagon, where the width is used as the swath of the paths in a field. The width of the implement is used to reduce the possibility of gaps between adjacent paths or that any portion of the adjacent paths overlapping each other.

Previously recorded information that describes, for example, the boundary of a field can be used. For example, the boundary information can be used to determine that the end of a row is approaching, that the end of a row has been reached, or the end of the row has been passed. Previously recorded information can be uploaded into the hardware memory 252D, for example, from a memory stick or from other type of memory.

Previously recorded information defining the boundary of a field, a path along a first point and second point, or paths that were worked during previous activities in a field can be stored and maintained in the hardware memory 252D of the mobile machine. Plowing a field is an example of a previous activity with respect to planting a field, spraying a field, or harvesting a field. Previously recorded information that is stored in the hardware memory 252D could then be available without uploading it.

According to one embodiment, after recorded information is available for a field, the mobile machine can perform auto-guidance without setting a first point, setting a second point or defining a path along the first point and second point. For example, the mobile machine can perform auto-guidance simply by activating one electromechanical switch after the recorded information for the field is available.

Swath

The width of an implement defines what is known as a "swath" in a field. For example, FIG. 1A depicts the swaths S1A, S2A, S3A, S4A, S5A, and S6A of field F1A. FIG. 1B depicts the swaths S1B, S2B, S3B and S4B of field F2B. FIG. 1C depicts the swaths S1C, S2C, S3C of field F1C. Each row or path is located at the center of a swath since the middle of the implement would be located on a row or path as the mobile machine with the attached implement is moving down the row or path. For example, referring to FIG. 1A, row R1A is in the middle of swath S1A, row R2A is in the middle of swath S2A. The width of the implement is used to reduce the possibility of gaps between adjacent paths or that any portion of the adjacent paths overlap each other.

The width of the implement, which is used to define the swath of a field, can be determined in several different ways. For example, the width of the implement can be uploaded into the mobile machine's hardware memory 252D using a memory stick. In another example, the human operator can manually line the implement up for the second path right next to the first path. GPS or GNSS positioning information can then be used to determine the width of the implement. More specifically, positioning information of where the first path, such as path R1A, and the second path, such as path R2A, can be used to determine that the width of the implement is the distance between the two adjacent paths R1A and R2A. The human operator may initiate determination of the implement width, for example, by actuating an electromechanical switch, or the autopilot operation system may automatically determine the swath, for example, when the GPS or GNSS positioning information indicates that the attached implement mobile machine is located at the beginning B2A of the second path or after the beginning B2A of the second path. Similar processing can be performed for fields depicted in FIGS. 1B and 1C for manually lining the implement up next to a previous path when performing a current path. According to one embodiment, an entire second path could be recorded as a part of determining an implement's width.

In another example, the implement may transmit a message to the autopilot operation system with the implement's width. According to one embodiment, the message is a CAN message. The message with the implement's width may be transmitted, for example, wirelessly or over a CAN bus.

Example Description of Operation

With reference to FIGS. 1A, 2A, and 3B, consider an embodiment where a mobile machine, tractor WM1 in this example, enters field F1A at beginning point B1A. At B1A the user interacts with switch 301B, such as by depressing it, to turn on the auto guidance system. At the same time, the user interacts with switch 302B, such as by depressing it, in order to set a first point P1A for auto-guidance of tractor WM1. The user drives the tractor along the path L1A and at point P2A interacts with switch 302B a second time, such as by depressing it again, to set a second point for auto-guidance of tractor WM1. An auto guidance system 202 receives the switch inputs made by the user, and records a geographic position associated with the first point and a geographic position associated with the second point (and may record locations of points in between). Upon the setting of the second point, the auto-guidance system activates auto-guidance of tractor WM1 along path L1A based by continuing to follow a first path along a path that that is defined by the first point and the second point. At end point E1A, the user interacts with switch 301B to disengage the auto-pilot, and then manually makes turn T1. In some embodiments, the user may then repeat the process to establish auto guidance along a path that follows row R2A. In some embodiments, after deactivating the auto-guidance of tractor WM1 the user may manually make turn T1, and at beginning point B2A interact with switch 301B, such as by depressing it again or perhaps twice in quick succession, in order to cause the auto-guidance system 202 to resume the auto-guidance along a second path that is offset at a fixed distance from and adjacent to the first path—e.g., along path that substantially overlays row R2A.

According to one embodiment, auto-guidance is deactivated automatically in response to detecting that the human operator is turning the wheel without the human operator interacting with one or more electromechanical switches. According to one embodiment, auto-guidance is activated, deactivated and resumed automatically in response to detecting that the mobile machine is at an appropriate location with respect to a boundary of the field without the human operator interacting with one or more electromechanical switches. For example, once recorded information for the field is available, the auto-guidance can be turned on, then the auto-guidance can be activated automatically or resumed automatically when the beginning of a row is encountered and deactivated automatically when the mobile machine encounters the end of the rows.

Method for Implementing Auto-Guidance

Figure 5:
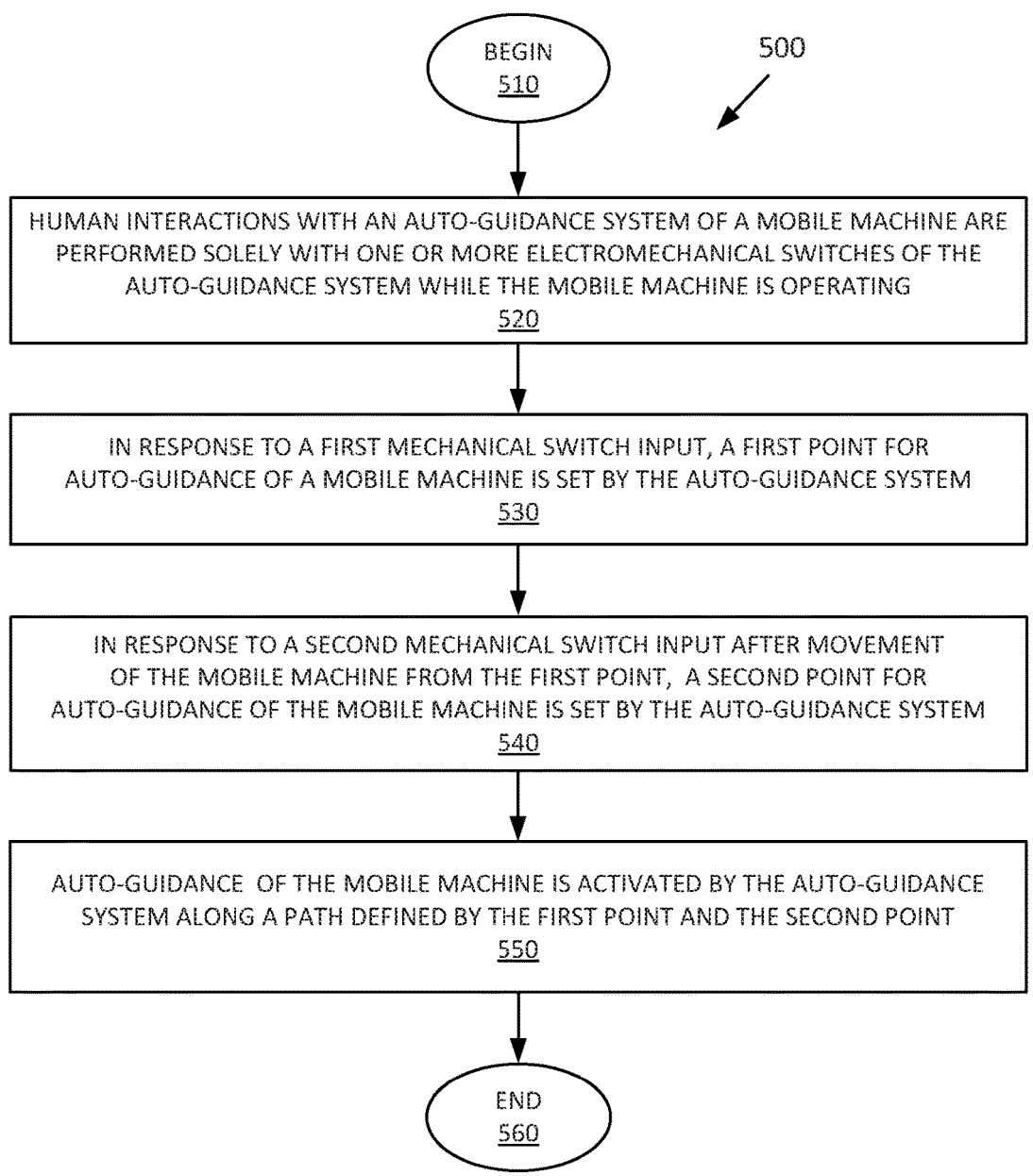
FIG. 5 depicts a flowchart 500 of a method for implementing auto-guidance, according to one embodiment.

FIG. 5 depicts a flowchart 500 of a method for implementing auto-guidance, according to one embodiment. According to one embodiment, the method does not require does not require a graphical user interface display.

At 510, the method begins.

At 520, human interactions with an auto-guidance system of a mobile machine are performed solely with one or more electromechanical switches of the auto-guidance system while the mobile machine is operating.

For example, all of the human operator's interactions with the auto-guidance system 200A-200E are performed solely with one or more electromechanical switches, such as those depicted in FIGS. 3A-3E, of the auto-guidance system 200A-200E while the mobile machine is operating. More specifically, the human operator interacts with the one or more electromechanical switches to set a first point, to set a second point, and to activate the auto-guidance system, as discussed herein. The human operator interacts with the one or more electromechanical switches by physically pushing, moving, or turning the electromechanical switch depending on whether the electromechanical switch is, for example, a physical button, physical lever, or a physical knob. Further, the setting of the first point, the setting of the second point and the activation of the auto-guidance system are the only activities that are required for providing auto-guidance of the mobile machine while it is operating, for example, in a field F1A, F1B, F1C, as discussed herein. In yet another embodiment, all human interactions with the auto-guidance system are performed solely with the electromechanical switches post manufacturing of the auto-guidance system 200A-200E.

At 530, in response to a first electromechanical switch input, a first point for auto-guidance of a mobile machine is set by an auto-guidance system.

For example, the first electromechanical switch input may be received due to actuation of a single electromechanical switch as depicted in FIG. 3A or due to actuation of one of multiple electromechanical switches as depicted in FIG. 3B or FIG. 3C, as discussed herein.

In the case of a single electromechanical switch as depicted in FIG. 3A, the first electromechanical switch input is a closing of a single electromechanical switch that is received and used to set the first point. According to one embodiment, the single electromechanical switch is a foot switch and the first electromechanical switch input is received when the foot switch is in a closed position. The foot switch is located on a floor of the mobile machine, according to one embodiment. According to one embodiment, the single electromechanical switch is a hand switch and the first electromechanical switch input is received when the hand switch is in a closed position. The hand switch is located on a steering wheel of the mobile machine, according to one embodiment. According to one embodiment, the single electromechanical switch is installed in a switch panel of the mobile machine and the first electromechanical switch input is received from the single electromechanical switch installed in the switch panel.

In the case of multiple electromechanical switches as depicted in FIG. 3B or FIG. 3C, the first electromechanical switch input is set when a first electromechanical switch is actuated. According to one embodiment, the first electromechanical switch input is generated in response to actuation of the first electromechanical switch. Examples of actuating are pressing and holding, quick press and release, moving an electromechanical switch into a locked position, and moving a lever. An example of moving an electromechanical switch into a locked position is pressing the electromechanical switch harder than when it is pressed, for example, to set a first point or a second point.

The set-first-point-logic 210D (FIG. 2D) sets a first point for auto-guidance of the mobile machine in response to receiving a first electromechanical switch input.

A single indicator, as depicted in FIG. 4A, or one of multiple indicators, as depicted in FIG. 4B, may output information indicating that the first point has been set, as discussed herein.

At 540, in response to a second electromechanical switch input after movement of the mobile machine from the first point, a second point for auto-guidance of the mobile machine is set by the auto-guidance system.

For example, the second electromechanical switch input may be received due to actuation of a single electromechanical switch as depicted in FIG. 3A or due to actuation of one of multiple electromechanical switches as depicted in FIG. 3B or FIG. 3C, as discussed herein.

In the case of a single electromechanical switch as depicted in FIG. 3A, the second electromechanical switch input is an opening of the single electromechanical switch that is received and used to set the second point. According to one embodiment, the second electromechanical switch is a foot switch and the second electromechanical switch input is received when the foot switch is in an open position. According to one embodiment, the second electromechanical switch is a hand switch and the second electromechanical switch input is received when the hand switch is in an open position. According to one embodiment, the single electromechanical switch is installed in a switch panel and the second electromechanical switch input is received from the single electromechanical switch installed in the switch panel.

In the case of multiple electromechanical switches as depicted in FIG. 3B or FIG. 3C, the second electromechanical switch input is set when a second electromechanical switch is actuated. Examples of actuation include releasing a button that was previously pressed and held down, quick press and release, moving an electromechanical switch into a locked position, and moving a lever. According to one embodiment, the second electromechanical switch input is generated in response to actuation of the second electromechanical switch.

The set-second-point-logic 220D (FIG. 2D) sets a second point for auto-guidance of the mobile machine in response to receiving a second electromechanical switch input after movement of the mobile machine from the first point.

A single indicator, as depicted in FIG. 4A, or one of multiple indicators, as depicted in FIG. 4B, may output information indicating that the second point has been set, as discussed herein.

At 550, auto-guidance of the mobile machine is engaged by the auto-guidance system along a path defined by the first point and the second point. For example, a path L1A, L1B, L1C may be defined along the first point P1A, P1B, P1C and the second point P2A, P2B, P2C as depicted in FIGS. 1A-1C. The path-definition-logic 230D (FIG. 2D) defines the path L1A, L1B, L1C along the first point P1A, P1B, P1C and the second point P2A, P2B, P2C, according to one embodiment, as depicted in FIGS. 1A-1C. The path goes through the first point and the second point. The path may be defined as being between the first point and the second point, as discussed herein. The auto-guidance-system-engaging-logic 240D engages auto-guidance of the mobile machine along the path L1A, L1B, L1C. After the second point P2A, P2B, and P2C is set, the auto-guidance system can auto-guide the mobile machine.

In some embodiments, the auto-guidance system automatically straightens one or more recorded variations in a path defined by the first point and the second point if the recorded variation(s) from an otherwise straight path between the first point and the second point is/are within a predetermined threshold. Straighten-path-logic 280D accomplishes this straightening in some embodiments.

Further, various embodiments provide for deactivating the auto-guidance of the mobile machine with respect to a first path R1A (FIG. 1A), R1B (FIG. 1B) of a field; and resuming the auto-guidance along a second path R2A (FIG. 1A), R2B (FIG. 1B) that is parallel with/offset at a fixed distance from and adjacent to the first path R1A (FIG. 1A), R1B (FIG. 1B). For example, referring to FIG. 1A, after the second point P2A is set, the auto-guidance system can auto-guide the mobile machine from the second point P2A to the end E1A of the row R1A. When the end E1A of the row R1A is approaching, the one or more indicators (FIGS. 4A-4B) can indicate that the end E1A of row R1A is approaching and that auto-guidance can be terminated. The human operator can take manual control of driving the mobile machine and manually turn the mobile machine around at turn T1A. When the mobile machine approaches location E2A, the human operator can manipulate an electromechanical switch to re-engage the auto-guidance system. Then the auto-guidance system can auto-guide the mobile machine for the second row R2A. The process can continue for all of the rows of the field F1A depicted in FIG. 1A.

In another example referring to FIG. 1B, after the second point P2B is set at the end E1B of the first row R1B, the auto-guidance can be terminated. The human operator can take manual control of driving the mobile machine and manually turn the mobile machine around at turn T1B. The human operator can manipulate an electromechanical switch to re-activate the auto-guidance system once the human operator has located the mobile machine at the beginning B2B of the second row R2B, which is a swath width below the first row R1B. Then the auto-guidance system can auto-guide the mobile machine for the second row R2B. The process can continue for all of the rows of the field F1B depicted in FIG. 1B.

Referring to FIG. 1C, after the second point P2C is set, the auto-guidance system can auto-guide the mobile machine for the rest of the continuous spiraling row C1C.

Various embodiments provide for recording information describing movement of the mobile machine along the path L1A, L1B, L1C for a first path R1A, R1B, R1C of a field F1A, F1B, F1C, for example, in hardware memory 252D of the autopilot operation system; and automatically guiding the mobile machine, based on the recorded information in the hardware memory 252D, along a subsequent path R2A, R2B, R2C that is adjacent to and parallel with/offset at a fixed distance from the first path R1A, R1B, R1C.

According to one embodiment, the path L1A (FIG. 1A) is a straight path and provides for recording information describing movement of the mobile machine along the straight path. The straight path can be at least a subset of the first path of the field. For example referring to FIG. 1A, the path L1A is a subset of the first row R1A of the field. The movement of the mobile machine along the straight path that is a subset of the first row can be stored in the hardware memory 252D of the autopilot operation system. The path may be an entire row or entire path.

According to one embodiment, the path L1B (FIG. 1B), L1C (FIG. 1C) is a non-straight path and provides for recording information, in the hardware memory 252D of the autopilot operation system, describing movement of the mobile machine along the non-straight path, where the second point P2B, P2C is located at the end E2B, E2C of the first path R1B, R1C of the field F1B, F1C.

According to one embodiment, the path L1A is associated with a first path R1A of a field F1A and various embodiments provide for deactivating the auto-guidance for a current path R1A of the field; re-activating (also referred to as "resuming") the auto-guidance for a subsequent path R2A of the field, wherein the current path and the subsequent path are adjacent to each other; and repeating the deactivating and the re-activating until all paths R1A-Rn of the field have been operated on by the mobile machine, where all of the paths R1A-Rn of the field are parallel with/offset at a fixed distance from each other based on the path. When path R2A is the current path, path R3A is the subsequent path. When path R3A is the current path, then path R4A is the subsequent path and so on until Rn-1 is the current path and Rn is the subsequent path. Similar processing can be performed for field F1B, depicted in FIG. 1B, where L1B is the path. When R1B is the current path, R2B is the subsequent path. When R2B is the current path, R2B is the subsequent path and so on for all of the paths R1B, R2B, R3B and R4B of the field F1B.

The setting of a first point (530), the setting of the second point (540), and the defining of a path along the first point and the second point (550), according to various embodiments, are examples of configuring the auto-guidance system. According to various embodiments, the configuring of the auto-guidance system is performed solely with one or more electromechanical switches.

At 560, the method ends.

Although specific operations are disclosed in flowchart 500, such operations are exemplary. That is, embodiments of the present invention are well suited to performing various other operations or variations of the operations recited in flowchart 500. It is appreciated that the operations in flowchart 500 may be performed in an order different than presented, and that not all of the operations in flowchart 500 may be performed.

The operations 510-560 can be performed by one or more hardware processors 251E.

The above illustration is only provided by way of example and not by way of limitation. There are other ways of performing the method described by flowchart 500.

The operations depicted in FIG. 5 can be implemented as computer readable instructions, hardware or firmware. According to one embodiment, a system, as depicted in FIGS. 2A-2D, can perform one or more of the operations depicted in FIG. 5. According to one embodiment, one or more of the operations depicted in FIG. 5 may be performed by another system. The other system can include hardware, such as a central processing unit, for executing computer readable instructions.

Computer Readable Storage Medium

Unless otherwise specified, any one or more of the embodiments described herein can be implemented using non-transitory computer readable storage medium and computer readable instructions which reside, for example, in computer-readable storage medium of a computer system or like device. The non-transitory computer readable storage medium can be any kind of physical memory that instructions can be stored on. Examples of the non-transitory computer readable storage medium include but are not limited to a disk, a compact disk (CD), a digital versatile device (DVD), read only memory (ROM), flash, and so on. As described above, certain processes and operations of various embodiments of the present invention are realized, in one embodiment, as a series of computer readable instructions (e.g., software program) that reside within non-transitory computer readable storage memory of a computer system and are executed by the hardware processor, such as one or more hardware processors 251D, of the computer system. When executed, the instructions cause a computer system to implement the functionality of various embodiments of the present invention. For example, the instructions can be executed by a central processing unit associated with the computer system. According to one embodiment, the non-transitory computer readable storage medium is tangible. The non-transitory computer readable storage medium may be hardware memory 252D. The central processing unit that executes the instructions may be hardware processor 251D.

Unless otherwise specified, one or more of the various embodiments described in the context of FIGS. 1A-5 can be implemented as hardware, such as circuitry, firmware, or computer readable instructions that are stored on non-transitory computer readable storage medium. The computer readable instructions of the various embodiments described in the context of FIGS. 1A-5 can be executed by one or more hardware processors 251D, which may be a central processing unit, to cause a computer system to implement the functionality of various embodiments. For example, according to one embodiment, the features 210D-240D (FIG. 2D) and the operations of the flowcharts depicted in FIG. 5 are implemented with computer readable instructions that are stored on computer readable storage medium that can be tangible or non-transitory or a combination thereof.

Conclusion

Example embodiments of the subject matter are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

Various embodiments have been described in various combinations and illustrations. However, any two or more embodiments or features may be combined. Further, any embodiment or feature may be used separately from any other embodiment or feature. Phrases, such as "an embodiment," "one embodiment," among others, used herein, are not necessarily referring to the same embodiment. Features, structures, or characteristics of any embodiment may be combined in any suitable manner with one or more other features, structures, or characteristics.

What is claimed is:

1. A method of implementing auto-guidance, the method comprising:
in response to a first electromechanical switch input from a user using one of three or less electromechanical switches without using any graphical user interface display while a mobile machine is at a first point, setting by the auto-guidance system the first point for auto-guidance of the mobile machine;
in response to a second electromechanical switch input from the user using one of the three or less electromechanical switches without using any graphical user interface display after movement of the mobile machine from the first point to a second point, setting by the auto-guidance system the second point for auto-guidance of the mobile machine;
activating, by the auto-guidance system, auto-guidance of the mobile machine; and
automatically guiding, by the auto-guidance system, the mobile machine along a path defined by the first point and the second point;
wherein the setting of the first point, the setting of the second point, and the activating are performed by one or more hardware processors.

2. The method as recited by claim 1, wherein the path is associated with a first path of a field, and the method further comprising:
deactivating the auto-guidance of the mobile machine with respect to the first path of the field; and
resuming the auto-guidance along a second path that is offset at a fixed distance from and adjacent to the first path.

3. The method as recited by claim 1, wherein the three or less electromechanical switches comprise a single electromechanical switch, and the method further comprising:
receiving the first electromechanical switch input that is a first actuating of the single electromechanical switch; and
receiving the second electromechanical switch input that is a second actuating of the single electromechanical switch.

4. The method as recited by claim 3, wherein the single electromechanical switch is a foot switch, and the method further comprising:
receiving the first electromechanical switch input when the foot switch is in a first position, wherein the foot switch is located on a floor of the mobile machine; and
receiving the second electromechanical switch input when the foot switch is in a second position.

5. The method as recited by claim 3, wherein the single electromechanical switch is a hand switch, and the method further comprising:
receiving the first electromechanical switch input when the hand switch is in a first position, wherein the hand switch is located on a steering wheel of the mobile machine; and
receiving the second electromechanical switch input when the hand switch is in a second position.

6. The method as recited by claim 3, wherein the single electromechanical switch is installed in a switch panel of the mobile machine, and the method further comprising:
receiving the first electromechanical switch input from the single electromechanical switch installed in the switch panel; and
receiving the second electromechanical switch input from the single electromechanical switch installed in the switch panel.

7. The method as recited by claim 1, wherein the three or less electromechanical switches comprise a first electromechanical switch and a second electromechanical switch, and the method further comprising:
receiving the first electromechanical switch input when the first electromechanical switch is actuated; and receiving the second electromechanical switch input when the second electromechanical switch is actuated.

8. The method as recited in claim 1, further comprising: upon determining that a recorded variation in the path from a straight path is within a predetermined threshold, automatically straightening the path.

9. The method as recited by claim 1, further comprising: recording information describing movement of the mobile machine along the path for a first path of a field; and automatically guiding the mobile machine, based on the recorded information, along a subsequent path that is adjacent to and offset at a substantially fixed distance from the first path.

10. The method as recited by claim 9, wherein the path is a straight path, and the method further comprising: recording information describing movement of the mobile machine along the straight path, wherein the straight path is at least a subset of the first path of the field.

11. The method as recited by claim 9, wherein the path is a non-straight path, and the method further comprising: recording information describing movement of the mobile machine along the non-straight path, wherein the second point is located at an end of the first path of the field.

12. A non-transitory computer readable storage medium having computer readable instructions stored thereon for causing a computer system to perform a method of implementing auto-guidance, the method comprising:
   in response to a first electromechanical switch input from a user using one of three or less electromechanical switches without using any graphical user interface display while a mobile machine is at a first point, setting by the auto-guidance system a first point for auto-guidance of the mobile machine;
   in response to a second electromechanical switch input from the user using one of the three or less electromechanical switches without using any graphical user interface display after movement of the mobile machine from the first point to a second point, setting by the auto-guidance system the second point for auto-guidance of the mobile machine;
   activating, by the auto-guidance system, auto-guidance of the mobile machine; and
   automatically guiding, by the auto-guidance system, the mobile machine along a path defined by the first point and the second point;
   wherein the setting of the first point, the setting of the second point, and the activating are performed by one or more hardware processors.

13. The non-transitory computer readable storage medium as recited by claim 12, wherein the path is associated with a first path of a field and wherein the method further comprises:
   deactivating the auto-guidance for a current path of the field;
   re-activating the auto-guidance for a subsequent path of the field, wherein the current path and the subsequent path are adjacent to each other; and
   repeating the deactivating and the re-activating until all paths of the field have been operated on by the mobile machine, wherein all of the paths of the field are offset at a substantially fixed distance from each other based on the path.

14. The non-transitory computer readable storage medium as recited by claim 12, wherein the three or less electromechanical switches comprise a single electromechanical switch, and wherein the method further comprises:
   receiving the first electromechanical switch input that is a first actuating of the single electromechanical switch; and
   receiving the second electromechanical switch input that is a second actuating of the single electromechanical switch.

15. The non-transitory computer readable storage medium as recited by claim 12, wherein the three or less electromechanical switches comprise a first electromechanical switch and a second electromechanical switch, and wherein method further comprises:
   receiving the first electromechanical switch input when the first electromechanical switch is actuated; and
   receiving the second electromechanical switch input when the second electromechanical switch is actuated.

16. The non-transitory computer readable storage medium as recited by claim 12, wherein the method further comprises:
   recording information describing movement of the mobile machine along the path for a first path of a field; and
   automatically guiding the mobile machine, based on the recorded information, along a subsequent path that is adjacent to and offset at a substantially fixed distance from the first path.

17. The non-transitory computer readable storage medium as recited by claim 16, wherein the path is a straight path and wherein the method further comprises:
   recording information describing movement of the mobile machine along the straight path, wherein the straight path is at least a subset of the first path of the field.

18. The non-transitory computer readable storage medium as recited by claim 16, wherein the path is a non-straight path and wherein the method further comprises:
   recording information describing movement of the mobile machine along the non-straight path, wherein the second point is located at an end of the first path of the field.

19. An autopilot operation system of a mobile machine that does not require a graphical user interface display, the autopilot operation system comprising:
   hardware that includes a memory and a processor;
   an auto-guidance system coupled to the hardware and configured to provide auto-guidance of the mobile machine;
   three or less electromechanical switches configured to receive a first electromechanical switch input and a second electromechanical switch input while the mobile machine is operating and moving from a first point to a second point,
   a plurality of logics stored in the memory and implemented by the processor, wherein the plurality of logics includes:
      a first logic that, when implemented by the processor, causes the auto-guidance system to set the first point for auto-guidance of the mobile machine in response to receiving the first electromechanical switch input from a user using one of the three or less electromechanical switches without using any graphical user interface display while the mobile machine is at the first point;
      a second logic that, when implemented by the processor, causes the auto-guidance system to set the second point for auto-guidance of the mobile machine in response to receiving the second electromechanical switch input from the user using one of the three or less electromechanical switches without using any graphical user interface display after movement of the mobile machine from the first point to the second point;

a third logic that, when implemented by the processor, causes the auto-guidance system to define a path from the first point to the second point; and a fourth logic that, when implemented by the processor, causes the auto-guidance system to activate the auto-guidance system so as to automatically guide the mobile machine along the path.

20. The autopilot operation system of claim 19, further comprising:

a translation-logic that, when implemented by the processor, translates the first electromechanical switch input and the second electromechanical switch input into CAN messages that are delivered to the auto-guidance system over a CAN bus of the mobile machine.

\* \* \* \* \*